United States Patent [19]

Drott

[11] Patent Number: 4,693,341
[45] Date of Patent: Sep. 15, 1987

[54] DISC BRAKE FOR AUTOMOTIVE VEHICLES

[75] Inventor: Peter Drott, Frankfurt am Main, Fed. Rep. of Germany

[73] Assignee: Alfred Teves GmbH, Frankfurt am Main, Fed. Rep. of Germany

[21] Appl. No.: 786,266

[22] Filed: Oct. 10, 1985

[30] Foreign Application Priority Data

Oct. 18, 1984 [DE] Fed. Rep. of Germany ....... 3438209

[51] Int. Cl.⁴ ............................................. F16D 65/30
[52] U.S. Cl. ..................................... 188/72.7; 411/349
[58] Field of Search ..................... 188/72.7, 72.6, 72.9, 188/106 F, 73.43–73.45, 79.5 K; 411/398, 349, 549

[56] References Cited

U.S. PATENT DOCUMENTS

| | | | |
|---|---|---|---|
| 1,400,364 | 12/1921 | Knapik | 411/398 X |
| 3,670,526 | 6/1972 | Martinetz | 411/349 X |
| 3,896,902 | 7/1975 | Queen | 411/398 X |
| 3,956,803 | 5/1976 | Leitner | 411/349 |
| 4,184,571 | 1/1980 | Karasudani | 188/72.7 |
| 4,544,045 | 10/1985 | Runkle | 188/72.7 X |

FOREIGN PATENT DOCUMENTS

| | | | |
|---|---|---|---|
| 1924024 | 11/1970 | Fed. Rep. of Germany | 188/72.7 |
| 1493143 | 11/1977 | United Kingdom | 188/72.7 |

*Primary Examiner*—Duane A. Reger
*Attorney, Agent, or Firm*—James B. Raden; Donald J. Breh

[57] ABSTRACT

A disc brake for use in automotive vehicles is disclosed including a hydraulic brake actuating and a mechanical brake actuating device comprising a thrust member for axially operating a hydraulic piston in response to manual rotation of an actuating shaft in a bore in the brake housing. The shaft is axially retained in the bore by an eccentrically positioned recess in the shaft and projection on the bore extending over only a portion of the shaft circumference and bore. The recess defines radial boundaries for engaging the projection to prevent axial movement and the eccentric relationship causes axial movement of the thrust member for operation of the brake piston.

2 Claims, 4 Drawing Figures

DISC BRAKE FOR AUTOMOTIVE VEHICLES

BACKGROUND OF THE INVENTION

The invention relates to disc brakes and, in particular, to disc brakes for automotive vehicles of the type having a brake carrier mounted stationarily to the vehicle, a brake housing straddling the edge of a rotatable brake disc and which is arranged axially, slidable relative to the brake carrier with two brake linings positioned on either side of the brake disc straddled by the brake housing. The disc brake is of the type also hving a mechanical actuating device provided for moving the brake housing including an actuating shaft rotatably supported ina bore of the brake housing. The actuating shaft acts on at least one of the brake shoes. There is also provided a retaining device to limit the axial slide of the actuating shaft.

A disc brake of this kind is disclosed in the German patent application No. 1,924,024, published without examination. In this apparatus, the retaining device for the actuating shaft is provided with a circlip which engages in a circular groove of the actuating shaft. By means of this retaining device, the actuating shaft is retained in one direction only. No retainment of the actuating shaft in the opposite direction is provided so that an actuating lever secured to the actuating shaft is allowed to strike against the housing upon deformation of an elastic scraper ring. This is a severe disadvantage particularly when there is a relatively large distance between the housing and the actuating lever, for example, in order to prevent contact corrosion.

SUMMARY OF THE INVENTION

It is, therefore, the object of the present invention to provide for an improved disc brake of the kind mentioned in that the actuating shaft is axially retained in a simple manner in both directions of movement.

According to a very important aspect of the invention, this object is achieved by providing in the bore of the brake housing a projection defining a retaining device.

According to another very important aspect of the invention, the actuating shaft is formed with a recess extending over at least a part of its circumference and includes radially extending boundaries adapted to be engaged by the projection.

Another feature of the invention provides that at least one of the boundaries extends over only a part of the circumference of the actuating shaft. In this way, a retaining device, which is comprised of very few components and which provides for easy, quick mounting is created in an extremely simple manner. Owing to the but slight axial tolerance, the efficiency of the disc brake is improved in that no losses of travel come about in the clamping direction and a scraper ring, which will experience only minimal deformation, may be provided.

According to a preferred embodiment of the invention, the projection is circular, ring-shaped with its axis being radially offset with respect to the axis of the bore thereby defining a crescent shaped projection. The circular, ring-shaped projection is preferably formed by a stepped bore which is provided in the housing in an easy manner from opposite sides.

A still further important feature of the invention provides for the recess to also be in the shape of a circular groove, with the boundary of the recess exetending over a part of the circumference of the actuating shaft defining a crescent shaped recess or groove.

Another feature of the invention provides for a substantially cylindrical section of the actuating shaft to be positioned eccentrically relative to the longitudinal axis of the actuating shaft.

A further important aspect of the invention provides for a bushing made of an antifriction metal in the bore of the housing in which the actuating shaft is supported and which provides for ease of motion of the actuation shaft.

According to another advantageous embodiment of the invention, the actuating shaft is provided with a radially extending, eccentrically arranged recess in which one end of a thrust member is accommodated. The other end of the thrust member is in abutment against an axially slidable actuating element providing for movement of the thrust member in an axial direction.

In addition to the mechanical actuating device, the disc brake may, according to the teachings of the invention, moreover be furnished with a hydraulic actuating device.

Advantageously, a cover disc is used to close the bore of the actuating shaft. The cover disc being insertable prior to the mounting of the shaft thanks to the inventive embodiment of the retaining device.

BRIEF DESCRIPTION OF THE DRAWINGS

The invention is described in more detail in the following Detailed Description Of The Preferred Embodiment and will be be better understood when read in conjuction with the drawings in which.

DETAILED DESCRIPTION OF THE PREFERRED EMBODIMENT

Figure 1:
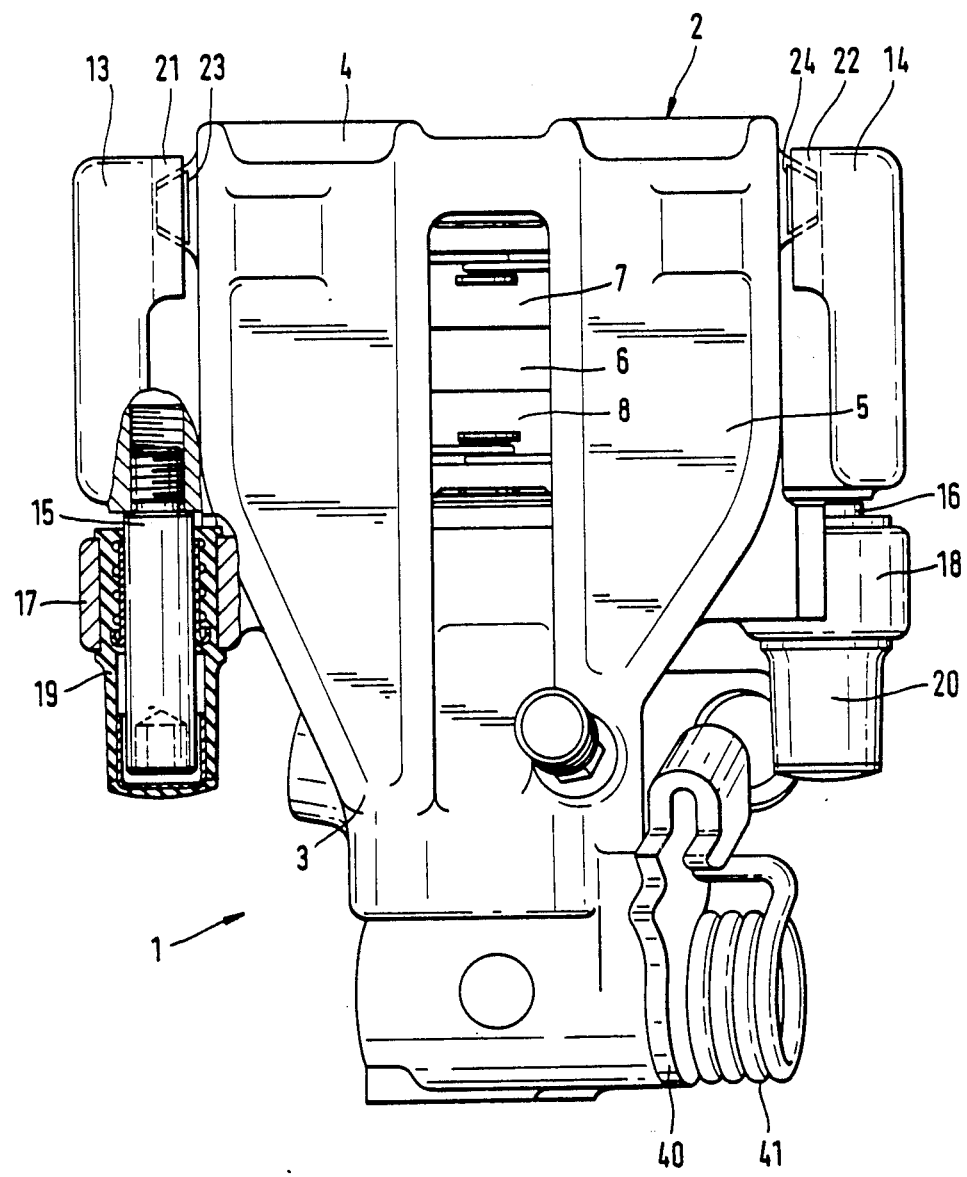
FIG. 1 is a top plan view of a disc brake suitable for combined hydraulic and mechanical actuation.
Figure 2:
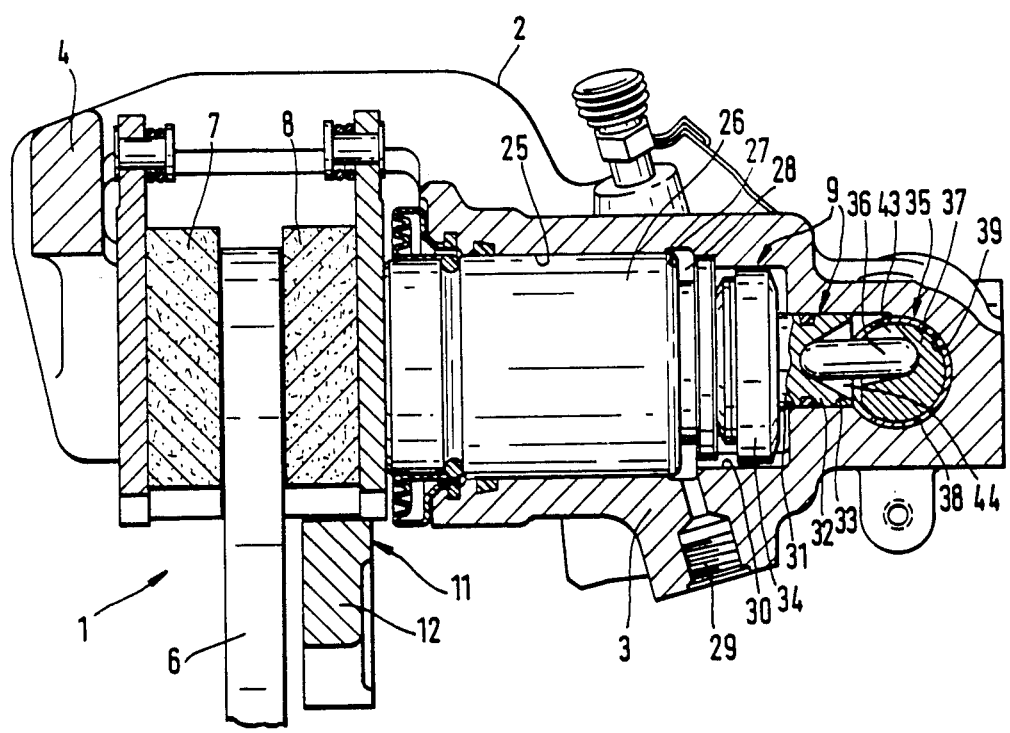
FIG. 2 is a longitudinal section through the disc brake according to FIG. 1.

A disc brake 1 illustrated in the drawing is provided with a brake housing 2 having a U-shaped longitudinal section and comprises an internal, radially extending stem 3 and an external stem 4 which also extends in the radial direction. The stems 3 and 4 are interconnected through a substantially paraxially extending bridge portion 5. The brake housing 2 straddles the external edge of a brake disc 6. Two brake linings 7, 8 are positioned on either side of the brake disc 6 which are also straddled by the brake housing 2. The internal stem 3 of the brake housing 2 contains a combined hydraulic and mechanical actuating device 9 which will be described in more detail hereinbelow.

The brake housing 2 is axially, slidably supported at a brake carrier 11 which is stationarily mounted to the vehicle. The brake carrier 11 is substantially comprised of a supporting element 12 arranged parallel to the brake disc 6 and two guide arms 13, 14 extending in an axial direction beyond the edge of the brake disc. The guide pins 15, 16 are screwed into the guide arms 13, 14 on the supporting element side of the brake disc. The brake housing 2 is guided on the pins of the supporting element side of the brake disc 6. For this purpose, the brake housing 2 is furnished with two lateral lugs 17, 18 extending in a circumferential direction and being provided with pores in which the guide pins 15, 16 are guided. Elastic guide elements 19, 20 are arranged in the bores.

On the other side of the brake disc 6, that is, on the side opposite the supporting element 12, a pair of guide grooves 21, 22 are provided in the guide arms 13, 14 for the purpose of guiding the brake housing. The guide grooves 21, 22 engage two lugs 23, 24 on the brake housing 2 which extend in a circumferential direction.

For providing hydraulic actuation of the disc brake 1, the internal stem 3 of the brake housing 2 is provided with a cylinder bore 25 which is oriented parallel to the axis of rotation of the brake disc and axially, slidably accomodates a brake hydraulically operated piston 26. The bottom 27 of the brake piston 26 and cylinder bore 25 form a pressure chamber 28 which is supplied with a pressure medium, such as hydraulic fluid, through a connection 29. The cylinder bore 25 has a stepped configuration with a mechanically actuatable parking brake piston 31 being axially, slidably supported in a section 30 which has a diameter reduced from that of the cylinder bore 25. The parking brake piston 31 is formed with a cylindrical section 32 which is guided within a section 33 of the bore 25 which has a diameter reduced still further from that of the bore 25 and section 30. Coupled to the cylindrical section 32, is a disc-shaped section 34 which is arranged in the section 30 of the cylinder bore and whose front end facing the brake disc 6 is provided with a thrust face being abuttable against the bottom 27 of the brake piston 26.

The parking brake piston 31 forms part of a mechanical actuating device which further includes an eccentric apparatus 35 which acts, through a thrust member 36, on the parking brake piston 31. The eccentric apparatus 35 is provided with an actuating shaft 37 which is supported in a bearing bushing 38 which is in turn accommodated in a bore 39 extending at right angles to the cylinder bore 25. A parking brake lever 40 is secured to one end of the actuating shaft 37 projecting from the bore 39. A helical spring 41 is provided to urge the parking brake lever 40 into its end released position which is defined by means of a pin 42 affixed to the housing. That part of the actuating shaft 37, which is supported in the bushing 38, includes an eccentrically arranged recess 43 within which an end portion of the thrust member 36 is positioned. The opposite end of the thrust member 36 is received in a concentric recess 44 provided in the cylindrical section 32.

Figure 3:
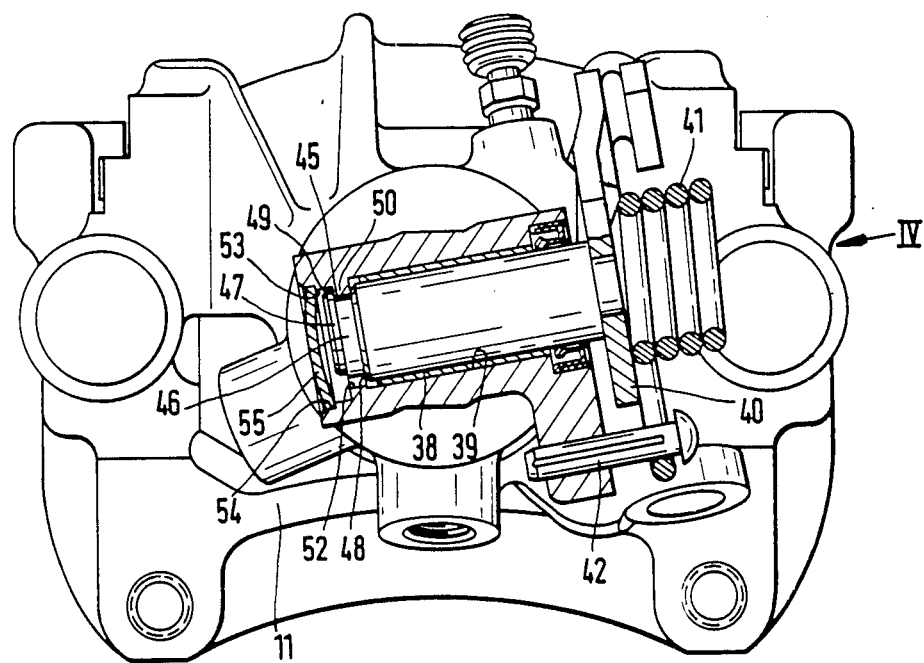
FIG. 3 is a cross-section through the mechanical actuating device of the disc brake according to FIGS. 1 and 2.
Figure 4:
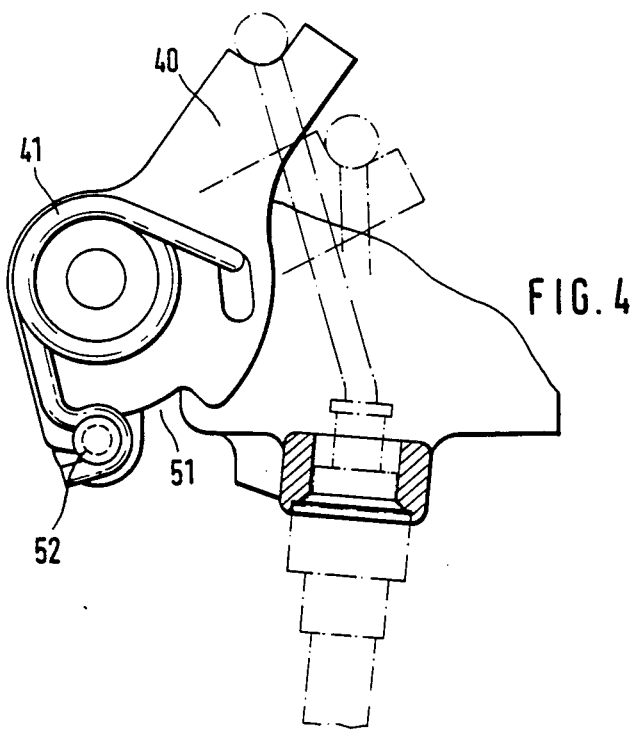
FIG. 4 is a view of the mechanical actuating device in the direction of the arrow IV in FIG. 3.

The end portion of the actuating shaft 37 which is positioned in the bore 39, is also provided with a circular groove-shaped recess 45 which extends over a portion of the circumference of the shaft 37 defining a cresecent shaped groove when viewed toward the lef end of the shaft in FIG. 3 and a cylindrical section 46 having a reduced diameter in comparison to the main part of the actuating shaft, is provided adjacent to the recess 45. Adjacent to the cylindrical section 46, another cylindrical section 47 is provided and arranged in an eccentrically offset position with respect to the cylindrical section 46. The circular, ring-shaped front face 48 at the transition between the main part of the actuating shaft 37 and the cylindrical section 46 thus forms a first axial boundary wall of the recess 45, whereas the second axial boundary wall is defined by the section 49 of the front face of the cylindrical section 47, which is crescent-shaped when viewed in the axial direction.

Due to this arrangement, the recess 45 extends over only a part of the circumference of the actuating shaft 37 and terminates tangentially toward the ends as viewed in the circumferential direction. A projection 50 extends into the recess 45 and is formed by a section 52 of the bore 39 having a reduced diameter and being arranged eccentrically with respect to the bore 39 defining a crescent shaped projection when viewed toward the left end of the shaft in FIG. 3. As best seen in FIG. 3, a counterbore 53 around the bore 39 accommodating the cylindrical section 47 of the shaft 37 is arranged adjacent to the reduced diameter section 52 of the bore 39. The counterbore section 53 of the bore 39 is succeeded, in its turn, by another counterbore section 54 around the bore 39 in which a cover lid 55 is inserted.

Owing to the fact that the recess 45 or, rather, the axial boundary formed by the cylindrical section 47 extends only over a part of the circumference of the actuating shaft, the actuating shaft can be brought into a position by rotation in which the axis of the cylindrical section 47 is congruent with the axis of the section 52 of the bore 39. In this position of the actuating shaft 37, the projection 50 no longer engages in the recess 45, and the actuating shaft may be pulled out of the bore in the axial direction. The actuating shaft 37 may also be inserted in the bore 39 when in the same angular position. The projection 50 is engaged in the recess 45 by rotating the actuating shaft which engagement effects an axial retainment of the actuating shaft in both directions. Suitable stops can be provided in order to limit rotation of the actuating shaft 37 to a range of rotation in which an axial motion of the shaft is not possible. The stops may, for example, be formed by a pin 42 which engages in a corresponding recess 51 of the parking brake lever 40, which recess 51 limits the rotation of the lever and shaft to a determined angle of rotation.

What is claimed is:

1. A disc brake for use in an automotive vehicle comprising, a brake carrier affixed to the vehicle, a brake housing straddling an edge of a rotatable brake disc, said brake housing being arranged axially slidably relative to the brake carrier, two brake linings positioned on opposite sides of said brake disc and straddled by the brake housing, a mechanical actuating device provided in the brake housing including an actuating shaft having a principal longitudinal axis rotatably supported in a bore having a longitudinal axis in the brake housing, said actuating shaft acting on at least one of the brake shoes and being provided with retaining means to limit axial movement of the actuating shaft in said bore said retaining means including,
    a section of a circular ring-shaped member on said housing protruding into said bore and having a longitudinal axis offset from the longitudinal axis of said bore defining a crescent shaped projection along a circumferential portion of the bore said projection including a pair of parallel crescent-shaped radial surfaces,
    a first cylindrical section proximate an interior end of said shaft concentric with the shaft principal longitudinal axis and having a diameter reduced from the diameter of said shaft, and
    a second cylindrical section at the interior end of said shaft, said second cylindrical section being eccentrically arranged with respect to the first cylindrical section an amount defining a crescent shaped groove along a length of a circumferential portion of said shaft corresponding to at least a predetermined minimum angle of rotation of the shaft including a pair of parallel, crescent shaped radial boundaries, said projection receivable within said groove, whereby said shaft is axially retained in said bore and is freely reversibly rotatable through an angle defined by the length of the circumferential portions of said bore and said shaft over which said respective crescent shaped projection and groove extend.

2. The brake as claimed in claim 1, wherein said actuating shaft includes a radially extending, eccentrically arranged recess in which one end of a thrust member is received, said thrust member including a second end thereof in abutment against an axially slidable actuating means to move said thrust member in an axial direction.

* * * * *